Aug. 9, 1966  G. BARGEL  3,265,182
APPARATUS FOR TRANSFERRING BOTTLES AND SIMILAR CONTAINERS
Filed May 19, 1964  2 Sheets-Sheet 1

Inventor:
GÜNTER BARGEL
BY Michael J. Striker
his ATTORNEY 3,265,182
APPARATUS FOR TRANSFERRING BOTTLES
AND SIMILAR CONTAINERS
Günter Bargel, Dortmund-Korne, Germany, assignor to
Holstein & Kappert, Dortmund, Germany
Filed May 19, 1964, Ser. No. 368,552
10 Claims. (Cl. 198—20)

The present invention relates to apparatus for handling bottles, jars, cans and other types of containers, and more particularly to an apparatus which serves to transfer loads of properly arrayed containers into crates, boxes or similar receptacles. Still more particularly, the invention mainly relates to an improved conveyor which serves to deliver containers to an arraying or aligning station from which the containers are automatically transferred into crates by means of gripper heads or the like.

It is an important object of the present invention to provide an apparatus which is capable of transferring bottles or similar containers in such a way that the containers are not likely to break, that the labels on the containers are not damaged prior to and/or during transfer, that a small force is necessary for transferring the containers into crates or other types of receptacles, and that the transfer of containers may be effected in a fully automatic way.

Another object of the invention is to provide an improved conveyor which serves to deliver containers to an arraying station and whose speed is automatically regulated in such a way that the pressure exerted upon arrayed containers by continuously advancing non-arrayed containers is reduced automatically at the time a load of arrayed containers is transferred into one or more receptacles.

A further object of the invention is to provide a novel control arrangement for the drive means of a conveyor which embodies the above-outlined features.

A concomitant object of the instant invention is to provide a control arrangement whose operation is synchronized with the operation of remaining component parts of the apparatus so that the intervals during which the speed of the conveyor is reduced correspond exactly to intervals during which the transfer mechanism engages and removes consecutively assembled loads of arrayed containers.

Still another object of the invention is to provide a system of arraying members or guides which may be used in improved apparatus and to construct the apparatus in such a way that several loads of properly arrayed containers may be transferred in a simultaneous step so as to fill two or more receptacles at a time.

A further object of the invention is to provide an apparatus of the above outlined characteristics which is especially suited for crating of bottles and similar containers consisting of glass or another brittle material.

With the above objects in view, one feature of my invention resides in the provision of an apparatus for transferring bottles and similar containers to crates or onto a transfer conveyor. The apparatus comprises a stationary support which may assume the form of a horizontal platform, an endless conveyor whose upper run advances containers toward and onto the upper side of the support, a transfer mechanism including one or more carriage located above and having a plurality of gripper heads movable with the respective carriages vertically toward and away from the upper side of the support so that the gripper heads may lift a supply of properly arrayed containers when the carriage or carriages move upwardly and away from the support, drive means including a variable-speed motor which is operatively connected with and which is arranged to drive the conveyor at variable speed, and a control arrangement which is operatively connected with the transfer mechanism and which is arranged to regulate the motor so that the speed of the conveyor decreases when the transfer mechanism moves toward and while the gripper heads remove loads of arrayed containers from the upper side of the support.

In accordance with a preferred embodiment of my invention, the drive means for the conveyor comprises a hydraulic motor (for example, a rotary piston motor) and the control arrangement then comprises an adjustable throttle valve member which is provided in the hydraulic circuit of the motor and which serves to regulate the speed of the conveyor by regulating the flow of pressure fluid through the motor, and a cam member which adjusts the valve member in response to movement of the transfer mechanism toward and away from the support. One of these members may be mounted on the transfer mechanism and the other member may be stationary so that the speed of the conveyor is regulated with requisite accuracy and in a fully automatic way whenever the transfer mechanism moves its gripper heads toward or away from the support.

The novel features which are considered as characteristic of the invention are set forth in particular in the appended claims. The improved apparatus itself, however, both as to its construction and its mode of operation, together with additional features and advantages thereof, will be best understood from the following detailed description of a specific embodiment with reference to the accompanying drawings, in which:

Figure 1:
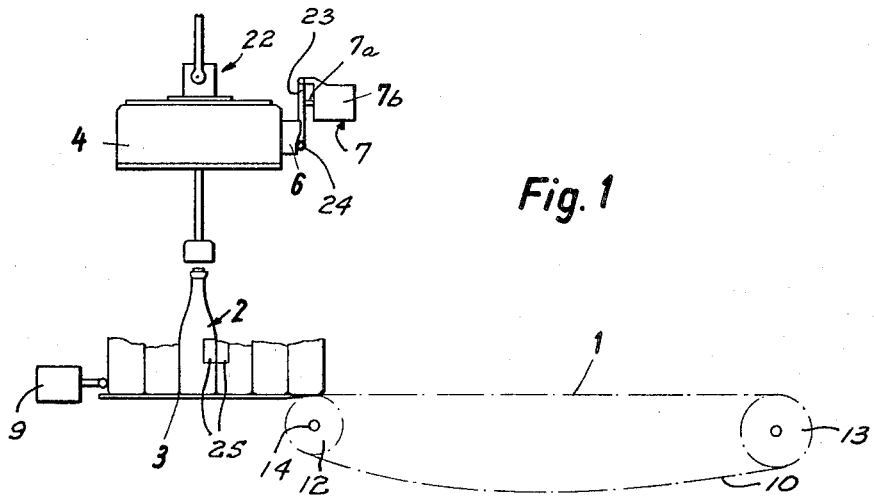
FIG. 1 is a schematic side elevational view of a portion of an apparatus which embodies my invention.
Figure 2:
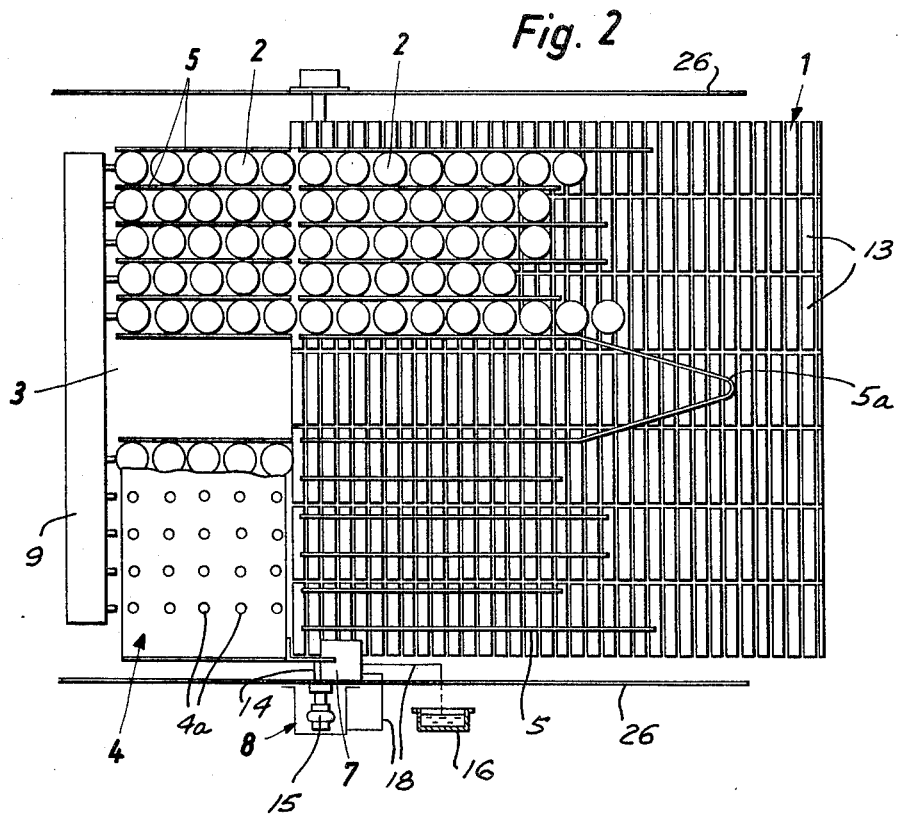
FIG. 2 is a top plan view of the structure shown in FIG. 1 with certain parts broken away for the sake of clarity.

Referring to the drawings, and first to FIGS. 1 and 2, there is shown a portion of an apparatus for transferring bottles, jars, cans or similar containers 2. The apparatus comprises a stationary support 3 from which the containers 2 are transferred into consecutive crates, boxes or other types of receptacles or onto a suitable take-off conveyor, not shown. The support 3 assumes the form of a horizontal platform whose upper side receives the containers from the upper run of an endless conveyor 1. Stationary arraying members or guides 5 of sheet metal strip stock or the like are provided at a level above the upper run of the conveyor 1 and above the upper side of the support 3 to serve as a means for properly arraying the containers 2 so that the latter may be engaged by pneumatic gripper heads 4a which extend downwardly from a transfer mechanism including two horizontally and vertically reciprocable carriages 4, only one shown. In the illustrated embodiment, each carriage 4 is provided with twenty-five gripper heads 4a so that the apparatus may fill two crates at a time and that each crate may receive twenty-five properly arrayed containers. A wedge-shaped central guide 5a serves to separate the containers on the conveyor 1 into two groups one of which advances into the range of that carriage 4 which is shown in FIG. 2 and the other of which advances into the range of the other carriage. There is a stationary stop 9 which arrests the foremost containers 2 between the guides 5 on the support 3 so that the next following containers come into abutment with the arrested containers and are properly arrayed to be in registry with the respective gripper heads 4a.

Figure 3:
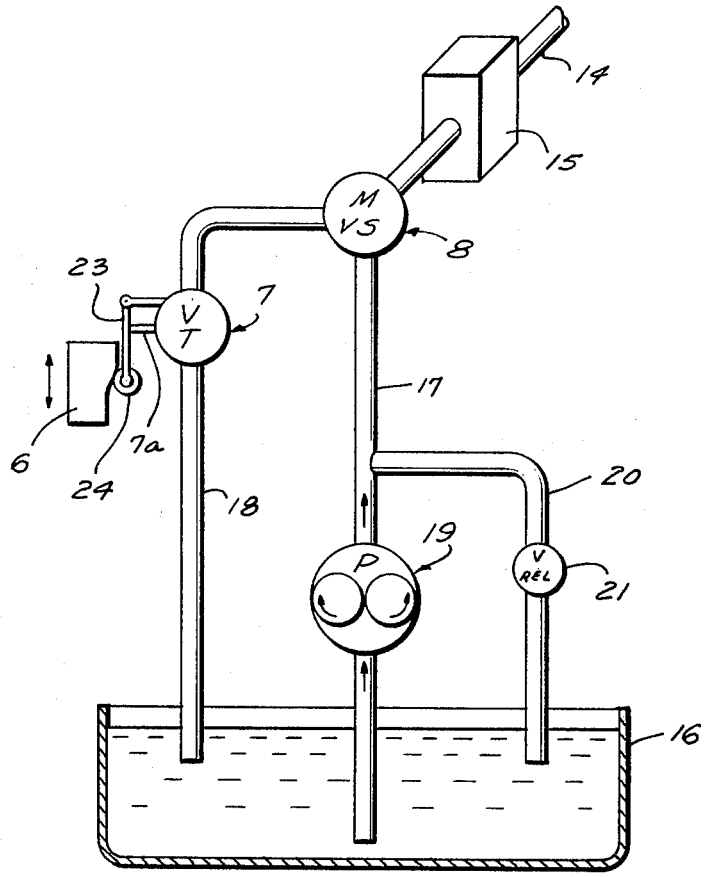
FIG. 3 is a diagrammatic view of the hydraulic circuit for the variable-speed motor which drives the conveyor of the improved apparatus.

The conveyor 1 comprises a plurality of endless chains 10 (one shown in FIG. 1) which are trained around driver sprockets 11 and idler sprockets 12 and which carry rows of transversely extending articulatable supporting plates 13 for the containers 2. The common shaft 14 of the driver sprockets 11 is driven by a variable-speed hydraulic motor 8 through a suitable step-down transmission 15, see also FIG. 3. The circuit of the motor 8 includes a source of hydraulic fluid here shown as an oil tank 16, a supply conduit 17 which connects the tank 16 with the inlet of the motor 8, a return conduit 18 which connects the tank 16 with the outlet of the motor 8, a gear pump 19 which is mounted in the supply conduit 17 and which delivers pressure fluid to the motor, an overflow line 20 which leads to the tank 16 and which communicates with the supply conduit 17 at a point downstream of the pump 19, and a pressure relief valve 21 which is provided in the line 20 and which opens in response to a predetermined fluid pressure in the supply conduit 17.

The control arrangeemnt which regulates the speed of the conveyor 1 includes an adjustable throttle valve 7 which is mounted in the return conduit 18 and a cam 6 which is mounted on one of the carriages 4 and which regulates the throttle valve 7 in a fully automatic way in response to reciprocation of the respective carriage 4 toward and away from the support 3. The configuration of the cam 6 is such that the valve 7 reduces the flow of fluid through the return conduit 18 when the carriage 4 descends toward the support 3 so that the speed of the conveyor 1 is also reduced and that the containers 2 supported by the upper run of the conveyor 1 cannot exert excessive pressure upon the containers which are already arrayed on the upper side of the support 3. When a fully loaded carriage 4 moves upwardly, the cam 6 is either disengaged from the valve 7 or enables this valve to permit more fluid to flow through the return conduit 18 so that the speed of the conveyor 1 increases and that a new supply of containers 2 is advanced onto the support 3 while the carriage 4 transfers its load into a crate or into another receptacle. The means for reciprocating the carriages 4 in horizontal and vertical paths is shown schematically at 22. A more detailed description of such re ciprocating means can be found in a copending application Serial No. 268,239, now Patent Number 3,209,923, filed by me jointly with Robert Eggert and assigned to the same assignee. The manner in which a pneumatic gripper head 4a may engage the top 2a of a bottle or a similar container is well known in the art and forms no part of the present invention. If the containers 2 are so-called bail stopper bottles, the heads 4a may be constructed in a manner as disclosed in my copending application Serial No. 268,241, now Patent Number 3,178,217, which is assigned to the same assignee.

The motor 8 may assume the form of a rotary piston motor wherein the r.p.m. of the rotor is directly proportional to the quantity of fluid flowing therethrough, and the valve 7 is a conventional adjustable throttle valve whose spring-biased stem 7a (see also FIG. 1) bears against a lever 23 which is pivotally connected with the valve housing 7b and which carries a roller follower 24 serving to track the face of the cam 6. The motor 8 and the valve 6 may be constructed in a manner as described and illustrated in my copending application Serial No. 366,984, filed May 13, 1964, entitled "Apparatus For Handling Bottles and Similar Containers" and assigned to the same assignee. The shafts of the sprockets 12, 13 and certain other parts of the apparatus are mounted in a stationary frame 26.

The apparatus of my invention operates as follows:

The pump 19 delivers compressed fluid to the inlet of the motor 8 and the latter drives the sprockets 12 via transmission 15 and shaft 14 so that the upper run of the conveyor 1 advances in a direction to the left, as viewed in FIGS. 1 and 2, and delivers randomly distributed containers 2 into the channels between the guides 5, 5a. The containers are compelled to enter and to form parallel rows while moving in the channels between the guides 5 at the upper side of the support 3, and the foremost container in each channel comes into abutment with the stop 9 whereby the next following containers are automatically arrested in such positions that each thereof is in registry with one of the gripper heads 4a as soon as the carriages 4 return to the position shown in FIG. 1, i.e., at a level above the stationary support 3.

When the reciprocating means 22 thereupon causes the carriages 4 to move downwardly and toward the upper side of the support 3, the cam 6 automatically adjusts the throttle valve 7 by pivoting the lever 23 so that the rotational speed of the shaft 14 decreases and the conveyor 1 advances at reduced speed. This means that the containers on the upper run of the conveyor 1 exert a lesser pressure upon the containers which are already transferred onto the support 3 so that a smaller force suffices to lift a load of arrayed containers from the support. Also, the likelihood of damage to labels 25 on the containers 2 is very remote which is of particular importance when the containers are properly filled and sealed and are ready to be shipped to distributors or consumers.

The carriages 4 thereupon perform an upward stroke to lift fifty containers above and away from the support 3 and to transfer such loads of arrayed containers into crates or other types of receptacles which may be located on a conveyor mounted at the left-hand side of the stop 9. While the carriages 4 move upwardly, the cam 6 releases the lever 23 or permits this lever to pivot under the bias of the stem 7a to such an extent that the valve 7 allows more fluid to return through the conduit 18 whereby the speed of the motor 8 increases and the conveyor 1 rapidly advances a new supply of containers onto the support 3 so that fifty properly arrayed containers are in registry with the gripper heads 4a as soon as the carriages 4 return to the position of FIG. 1. The procedure is then repeated in the same way.

When the throttle valve 7 reduces the rate of fluid flow through the return conduit 18, the valve 21 opens and allows excess fluid delivered by the pump 19 to return to the tank 16 via line 20.

It goes without saying that the position of the cam 6 and throttle valve may be reversed, i.e., that the valve 7 may share the movements of a carriage 4 while the cam 6 remains stationary. This would merely amount to a reversal of functions but the basic operation would remain unchanged. It is also within the scope of my invention to utilize a variable-speed electric motor and to use the cam 6 or an equivalent actuating device as a means for adjusting a variable resistor in the circuit of the electric motor. This modification of my invention is so obvious that it will be readily comprehended by men skilled in the art without necessitating a separate illustration. All that counts is to regulate the speed of the conveyor 1 in dependency on the position of one or more carriages 4 in such a way that the speed of the conveyor decreases when a carriage is about to lift a load of containers and that the speed of the conveyor may increase as soon as the carriages have removed loads of properly arrayed containers to make sure that the carriages may withdraw containers at the time such containers are subjected to comparatively low pressure and are not likely to break or that their labels are not likely to undergo damage during extraction.

If desired, the conveyor 1 may be brought to a complete halt whenever the carriages 4 engage and lift a new load of containers.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In an apparatus for transferring bottles and similar containers, in combination, a stationary support; a conveyor arranged to continuously advance a row of containers toward and onto said support so that a plurality of containers of said row of containers is located on said stationary support in predetermined position and maintained in such predetermined position by pressure of following containers on said conveyor tending to move in direction toward said plurality of containers on said stationary support; a transfer mechanism arranged to reciprocate substantially vertically toward and away from said support, said mechanism comprising individual gripper means for each of said plurality of containers and arranged in the same predetermined position as said plurality of containers on said stationary support means, said gripper means being adapted to lift said plurality of containers from said support when said mechanism moves upwardly; drive means including a variable-speed motor arranged to drive said conveyor at variable speed; and a control arrangement operatively connected with said transfer mechanism and arranged to reduce the speed of said motor and thereby reduce also the speed of said conveyor while said transfer mechanism lifts said plurality of containers from said stationary support, said reduction of speed of said conveyor being sufficient to prevent excessive pressure of the following containers on said conveyor against said plurality of containers on said stationary support during lifting of said plurality of containers, so as to avoid any undesired resistance to lifting of said plurality of containers caused by such excessive pressure while maintaining a limited pressure sufficient to retain said plurality of containers in their predetermined position on said stationary support, enabling proper engagement of said containers by said individual gripper means.

2. In an apparatus for transferring bottles and similar containers, in combination, a stationary platform having a horizontal upper side; an endless chain conveyor having a horizontal upper run arranged to advance randomly distributed containers toward and onto the upper side of said platform; a plurality of stationary guide means located above said upper run and above said platform and defining channels for entry and advance of containers so that the containers which move onto said platform are arrayed in parallel rows; stationary stop means adjacent to said platform and positioned in the path of foremost containers in each row; a transfer mechanism comprising a vertically reciprocable carriage located at a level above said platform and comprising a plurality of downwardly extending pneumatic gripper heads distributed in such a way that each thereof may engage a separate container of the array on said platform; means for reciprocating said carriage toward and away from the upper side of said platform so that each gripper head may engage a container when the carriage descends and that each gripper head lifts the respective container when the carriage thereupon moves upwardly; drive means for said conveyor including a sprocket drivingly connected with the conveyor, a shaft fixed to said sprocket, a variable-speed hydraulic motor having an inlet and an outlet, a step-down transmission driven by said motor and connected with said shaft so as to drive the conveyor at a speed proportional with the momentary speed of the motor, a source of hydraulic fluid, a supply conduit and a return conduit respectively connecting the inlet and the outlet of said motor with said source, and a pump mounted in said supply conduit to deliver compressed fluid to said motor and to thus drive said shaft; and a control arrangement for regulating the speed of said motor in such a way that the speed of said conveyor decreases automatically when said carriage moves toward and while said gripper heads remove arrayed containers from said platform, said control arrangement comprising a cam secured to said carriage and an adjustable throttle valve provided in said return conduit and located in the path of said cam so as to automatically regulate the flow of fluid through said motor and said return conduit in response to reciprocation of said carriage.

3. A combination as set forth in claim 2, further comprising an overflow line communicating with said source and with said supply conduit downstream of said pump, and a pressure relief valve in said overflow line, said pressure relief valve being adjusted to open when said throttle valve reduces the rate at which the fluid flows through said return conduit.

4. An apparatus as defined in claim 1, wherein said stationary support has an upper side and wherein said conveyor advances said containers onto said upper side of said stationary support; and further comprising guide means adjacent to the upper side of said stationary support and arranged to guide said plurality of containers into said predetermined position thereof.

5. An apparatus as defined in claim 1, wherein said motor is a hydraulic motor having an inlet and an outlet, and wherein said drive means further comprises a source of hydraulic fluid, supply conduit means connecting said inlet with said source, return conduit means connecting said outlet with said source, and a pump provided in said supply conduit means to deliver compressed fluid to said motor.

6. An apparatus as defined in claim 5, wherein said control arrangement comprises an adjustable throttle valve member mounted in one of said conduit means, and an actuating member arranged to adjust said valve member, one of said members being secured to and movable with said transfer mechanism.

7. An apparatus as defined in claim 6, wherein said transfer mechanism includes a carriage, and wherein said individual gripper means are provided on said carriage, said gripper means being fluid-operated.

8. An apparatus as defined in claim 6, wherein said transfer mechanism includes a plurality of carriages each arranged to reciprocate substantially vertically toward and away from said stationary support, and each of said carriages being provided with a plurality of said individual gripper means so that each of said carriages can lift a plurality of said containers from said stationary support.

9. An apparatus as set forth in claim 6, wherein said valve member is stationary and wherein said actuating member is a cam mounted on said transfer mechanism.

10. A combination as set forth in claim 8, wherein said carriages comprise equal numbers of gripper means and wherein the distribution of gripper means is the same on each of said carriages.

References Cited by the Examiner

UNITED STATES PATENTS

| 1,061,122 | 5/1913 | Quinby | 91—118 |
| 2,861,670 | 11/1958 | Read | 198—110 X |
| 3,008,563 | 11/1961 | Carter | 53—166 X |
| 3,130,528 | 4/1964 | Anderson | 53—166 X |

MARVIN A. CHAMPION, *Primary Examiner.*